United States Patent [19]
Szabo et al.

[11] Patent Number: 4,579,480
[45] Date of Patent: Apr. 1, 1986

[54] REMOTELY CONTROLLABLE HANDLING DEVICE FOR SUBMERGED STRUCTURES, PARTICULARLY FOR CONNECTING UNDERWATER PIPES

[75] Inventors: René Szabo, Le Pecq; Alain Bonneau, Auteuil Le Roi; Emile Levallois, Paris, all of France

[73] Assignee: Coflexip, Paris, France

[21] Appl. No.: 603,351

[22] Filed: Apr. 24, 1984

Related U.S. Application Data

[63] Continuation of Ser. No. 531,503, Sep. 12, 1983, abandoned, which is a continuation of Ser. No. 211,626, Dec. 1, 1980, abandoned.

[30] Foreign Application Priority Data

Dec. 3, 1979 [FR] France .............................. 79 29655

[51] Int. Cl.⁴ .............................................. F16L 1/04
[52] U.S. Cl. ..................................... 405/169; 405/191
[58] Field of Search ............... 405/158, 169, 170, 191; 180/9.44; 285/23, 39, 105; 294/86 CG, 106; 414/745, 747

[56] References Cited

U.S. PATENT DOCUMENTS

| | | | |
|---|---|---|---|
| 3,874,706 | 4/1975 | Arnold | 285/105 X |
| 3,969,905 | 7/1976 | Dolza | 405/170 X |
| 4,014,180 | 3/1977 | Kelly et al. | 414/747 X |
| 4,019,334 | 4/1977 | Sinclair et al. | 405/169 |
| 4,072,203 | 2/1978 | Pierson | 180/9.44 |

*Primary Examiner*—David H. Corbin
*Attorney, Agent, or Firm*—Brisebois & Kruger

[57] ABSTRACT

A remotely controlled undersea vehicle has a manipulator arm articulated to a mast which is articulated on the vehicle. Jaws at the end of the arm are arranged to close around a collar of a conduit having an automatic connector end, and to connect control fluid passages of the jaws to passages in the collar which communicate the control fluid to the automatic connector end.

8 Claims, 5 Drawing Figures

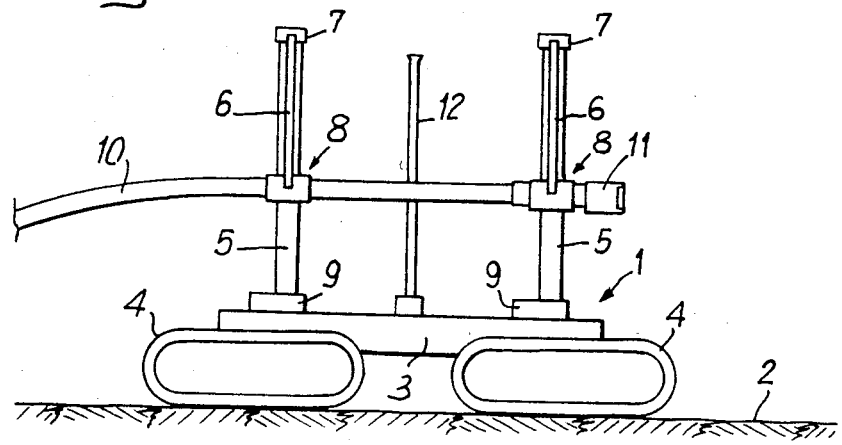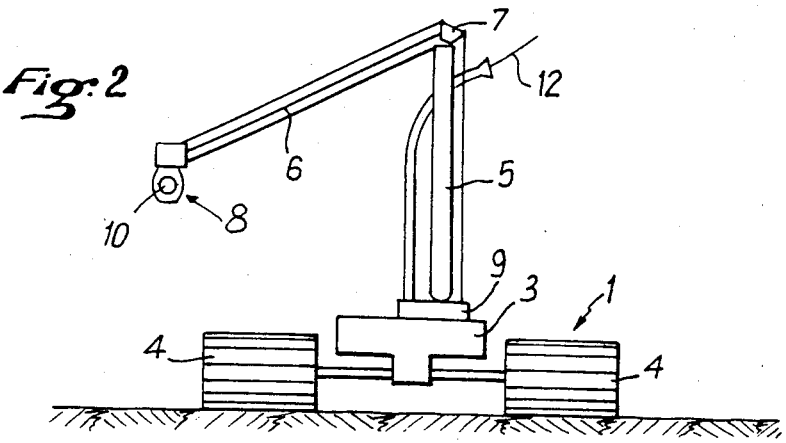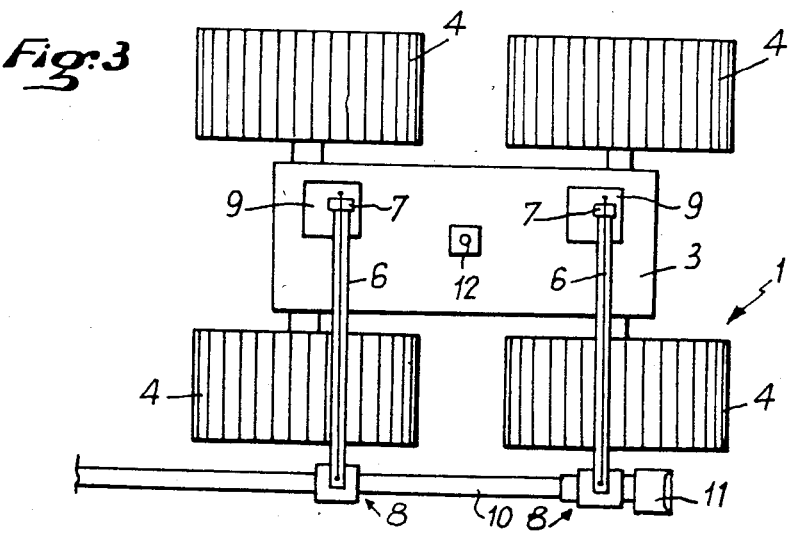

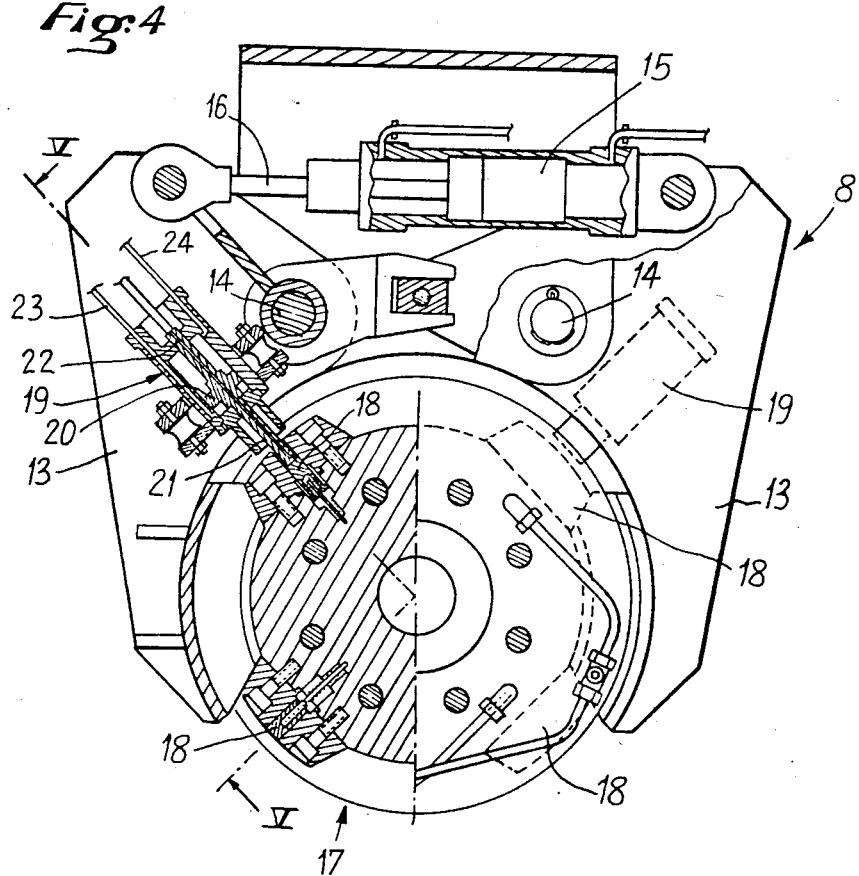
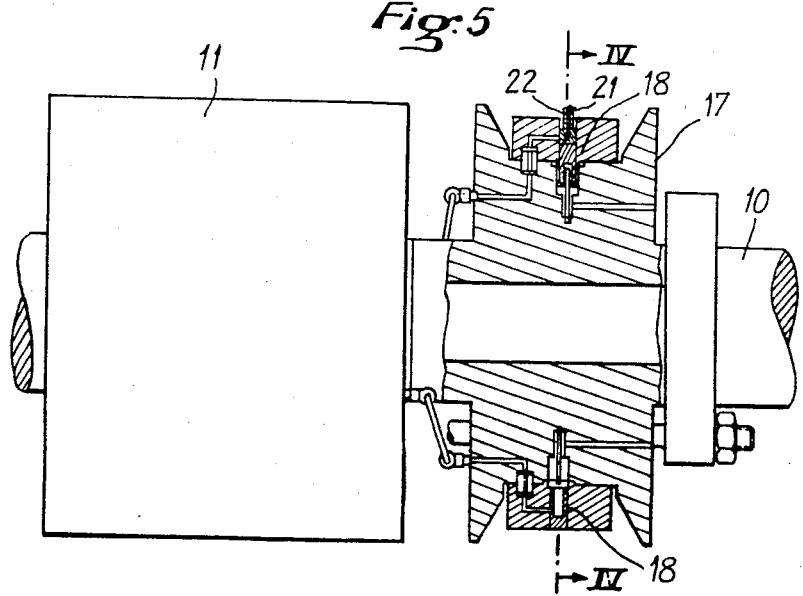

REMOTELY CONTROLLABLE HANDLING DEVICE FOR SUBMERGED STRUCTURES, PARTICULARLY FOR CONNECTING UNDERWATER PIPES

This is a continuation, of application Ser. No. 531,503, filed Sept. 12, 1983, now abandoned; which was a continuation of Ser. No. 211,626, filed Dec. 1, 1980, now abandoned.

The present invention relates to a device controllable from a distance from a surface support vessel for operating on submerged structures and connecting underwater pipes, notably flexible tubular pipes on or near the sea floor.

With the recent development of submerged well heads for hydrocarbons there has been a very significant increase in the number of sub-marine connections to be made, and pipes to be manipulated at greater and greater depths.

The actual techniques usually use undersea divers to carry out operations, notably connections, for example, between flexible tubular pipes which transport hydrocarbons, and well heads.

Making a connection is usually done in three phases: first of all, the approach or bringing the conduit to the point of connection, then locking of ends in the receptacles provided for this purpose on the structures to be connected, and finally making the connection itself hydraulically or electrically.

For the approach phase, it is often necessary to move the conduit a long distance which requires the use of heavy equipment, such as drags or skids for the ends of conduits, the movements of the ends of the conduits being initially from heavy surface supports capably of operating a string of rods like hoists used for drilling. The last phase, that is to say the connecting phase, is carried out either by divers or by means of hydraulic tools operated from the surface.

The actual techniques thus usually require heavy and thus burdensome equipment, and also, most of the time, the intervention of divers, which because of the risks presented by the equipment, limits the intervention of divers.

The present invention proposes to provide an apparatus to avoid these disadvantages recited above.

The apparatus according to the invention is characterized essentially by the fact that it includes a driven vehicle mobile on the sea floor, connected to and controllable from a surface support, the vehicle comprising a frame on which are articulated two vertically spaced apart masts, at the ends of which are articulated manipulator arms each comprising a jaw at its end.

The device according to the invention may be used to maneuver conduits, such as flexible tubular conduits resting on the sea floor, for example to displace them, the two manipulator arms permitting grasping at two places the conduit on the sea floor, to lift it and to displace it, and thus to manipulate it as desired.

However, the preferred utilization of the device of the invention is in the field of the connection and disconnection of conduits, particularly flexible conduits, which have at least one automatic end connector.

The combined use of the two arms, after having lifted and possibly displaced the conduit, permits, in this case, to position it with precision with respect to the structure to which it is to be connected.

To assure such positioning, the arm most distant from the end of the conduit holds the conduit after having given it a determined orientation, while the arm nearest the conduit end provides fine movements to change the position of the end of the pipe so as to bring it exactly to the position of connection.

Movements of this sort are permitted by the structure of the manipulator arms which each have, on the one hand, articulation in one or more, for example three degrees of freedom on the masts or posts connected to the frame, these upright posts each being attached on the other hand by an articulation with one or several, for example three degrees of freedom to the frame of the vehicle.

In one particular embodiment, the tubular conduit is provided near its end, upstream of the automatic connector, with an external collar on which can be engaged the jaws of one of the manipulator arms, means being provided on the collar and on the fingers forming the jaws, to assure that while the jaw is attached and immobilized on the collar, there is transmission of control fluid between the jaw and the automatic end connector.

These means may advantageously be constituted of normally closed valves disposed near the periphery of the collar, and whose opening, caused by the rods of the cylinders borne by the fingers of the jaw and when engaged in external opening of the collar assure communication of the control fluid between the jaw and the collar, the fluid passing then through the pipes provided for this purpose, from the collar toward the automatic connector.

By opening the fingers of the jaw and retracting the cylinder rods, the valves of the collar return to the normal closed position in which feeding of the control fluid to the connector is interrupted.

It will of course be understood that disconnection (of the connector) is caused in the same manner after engagement of the corresponding jaw on the collar.

The hydraulic cylinder contained in one or in each of the fingers of the jaw, comprises an enclosure or cylinder in which two chambers are defined by a pistion; each of the chambers can be independently supplied with control fluid, the piston being traversed by a hollow shaft attached to the piston and through the interior of which can circulate the fluid used to supply the automatic connector through the valves of the collar mounted on the conduit.

The driven vehicle of the device according to the invention comprises advantageously, to support the frame on which are mounted the manipulator arms, four caterpillar tracks of independent articulation, each of the caterpillar tracks having a rolling track, for example of rubber plates stiffened by articulated crossbars. The two front caterpillar tracks, like the two rear caterpillar tracks, are nevertheless held rigid between themselves in such a manner as to stay parallel, regardless of their position during the advance of the vehicle.

The device according to the invention is of course completed by a conventional navigation system, composed of means for examination orientation and observation permitting the detection of the objective, for example, a well head, and to position itself with respect to this for the purpose of carrying out the connection operations.

At the same time the assembly operation is observed by a television system controlled by the operators based on the surface support vessel and this last can be a relatively light support vessel independent of the heavy production support.

One observes that the device according to the invention does not need, contrary to the known devices, the presence of guidelines or any other mechanical surface-floor liason system permanently installed on the structures to be connected. The only liason between the device and the surface is carried out by use of a flexible service cable designed to move the fluids, particularly hydraulic control fluids, as well as to transmit information between the device and the surface support.

Other advantages and characteristics of the invention will become apparent upon reading the following description of one particular embodiment and referring to the attached drawings on which:

FIG. 1 is a schematic view in side elevation of the device according to the invention, FIG. 2 is a front elevational view of the same device, FIG. 3 is a top view of the device, FIG. 4 shows an end view with portions removed and partially cut away along the line IV—IV of FIG. 5, of a jaw mechanism of the device according to the invention, FIG. 5 is a cross-sectional view along the line V—V of FIG. 4, the jaw being omitted for better clarity.

The device according to the invention comprises a drivable vehicle 1, mobile on the sea floor shown schematically at 2, and including essentially a frame 3, mounted on four caterpillar tracks 4. These caterpillar tracks are independently articulated, that is to say, each caterpillar track may take any position whatever with respect to the other caterpillar tracks as a function of the nature of the terrain, it being understood however that the two front caterpillar tracks as well as the two rear caterpillar tracks are attached so that they are always parallel with each other at the time of the movement of the vehicle.

On the frame 3 are articulated upright masts or posts 5, one near the front end of the vehicle and the other near its back end.

At the top end of each of the upright posts 5 is a manipulator arm 6, the connection between arm 6 and the corresponding upright post 5 is accomplished by means of an articulation 7 having one or several degrees of freedom.

The forward end of each of the arms 6, bears a gripping mechanism having jaws 8. The upright posts 5 are articulated on the frame 3 by means of an articulation 9 with one or several degrees of freedom.

Shown schematically on FIGS. 1 to 3 is a conduit, such as flexible tubular conduit 10, gripped by the jaws 8 of the device.

Flexible tubular conduit 10, which is for example of the type of long length produced and sold by applicant's company, has at one end, for making connections, for example, at the head of a well (not shown) an automatic connector 11, shown schematically.

Also shown on FIGS. 1 to 3 is the liason by means of supply line 12, which permits directing toward the vehicle 1, the necessary control fluids as well as directing to and from the surface information for operation.

Certainly, the vehicle includes a navigation system, not shown, as well as visual control means such as cameras placed at different positions for visual supervision of the operations.

Referring now to FIGS. 4 and 5 which illustrate the fluid supply to the jaws, that is from a surface support or from an intermediate reservoir carried by the vehicle to an automatic connector 11 shown schematically.

The gripping mechanism with jaws shown as a whole at 8, includes two jaws 13 pivotally mounted on pivots 14, the opening and closing maneuvers of these jaws being carried out by a cylinder 15, of which the rod 16 shown in extended position at FIG. 4, caused the closing of jaws 13 around a collar 17 attached to the tubular conduit 10 upstream from the automatic connector 11, this latter not being shown on FIG. 4 for better clarity.

The pivot mechanism permitting the opening and closing of the jaws is itself conventional and will not be described in further detail here.

Collar 17 includes a number of valves 18, four in number in the example shown.

Each of the jaws 13 includes a piston 20 to which is attached a rod 21 which, in the closed position of the jaws such as shown at the left on FIG. 4, traverses a peripheral orifice of the collar and manipulates the corresponding valve 18.

Shaft 21 is traversed by conduit 22, supplied with control fluid, which in the open position of the valve 18 shown at the left on FIG. 4, flows to collar 17, via passage 30 and from there, by means of the ducts and pipes 31 provided for this purpose, to the automatic connector 11 for the operations of connecting and disconnecting.

For their operation, cylinders 19 include two supply ducts 23 and 24 for the control fluid, each opening into one of the chambers defined by piston 20.

The operation of the device according to the invention is as follows:

After gripping a conduit to be connected in the jaws of the manipulator arms, the vehicle of the device according to the invention is moved close to the structure to which the connection is to be made.

By relative displacements of the arms around their articulations, connector 11 can be brought exactly into alignment with the position of the connector of the structure to be connected, for example, a well head.

The automatic connector can then be activated by supplying it with control fluid from the jaws by feeding control fluid through duct 24 of each cylinder 19, so that rod 20 is displaced toward the front of the cylinder and operates the corresponding valves.

Duct 22 of the rod is then supplied with control fluid to operate the automatic connector.

After the connection is made, duct 23 is supplied with fluid, which causes the retraction of rod 21 of each cylinder, valves 18 returning to closed position by means of their return springs, 18 as for example shown for the valve on the lower part of FIGS. 4 and 5. Ports 32 communicate the inner ends of valves 18 with the undersea pressure so that the valves are hydrostatically balanced.

The jaws are then released by the operation of cylinder 15 and the device can be used for other connections or for other operations of manipulation of the conduits.

To perform disconnection, the same operations are done to bring the jaws to grip the collar, which allows the automatic connector to be supplied (with fluid) again.

The collar shown comprises four valves regularly spaced around its periphery which permit the positioning of the jaws at different orientations around conduit 10.

Although the invention has been described in reference to one particular embodiment, it is evident that it is in no way limited, and that numerous modifications can be made without departing either from its scope or its spirit.

We claim:

1. A remotely controllable undersea vehicle for connecting undersea conduits to submerged structures, said vehicle having a front and a back, and comprising, a frame, means on said vehicle for moving the vehicle along a floor of a body of water, means for controlling the vehicle from a support vessel at the surface of the body of water, a first upright mast articulated on said frame, a first manipulator arm articulated on an end of said first mast, a gripping mechanism at the end of said arm, said gripping mechanism comprising first and second jaws, pivot means mounting the jaws for pivotal movement relative to each other between open and closed positions, motor means for opening and closing said jaws, and wherein the conduit which is connected is tubular and has an automatic connector end, and an external collar on the conduit outwardly of the automatic connector end and which can be engaged by the jaws of the manipulator arm, cooperating means on the collar and the jaws for connecting control fluid passages of the jaws with passages of the collar when the jaws are engaged on the collar, and duct means for transmission of the control fluid between the jaws and the automatic connector end.

2. A vehicle according to claim 1, wherein said cooperating means comprise normally closed valves in passages of said collar adjacent the periphery of the collar, and fluid operated cylinders on said jaws, said cylinders having rods engageable with said valves for operating the valves to an open position.

3. Device according to claim 2, wherein each of said cylinders comprises an enclosure in each jaw, a piston within each enclosure, means to supply control fluid to each side of the piston, a hollow rod attached to each piston and through the interior of which the control fluid can be fed to the collar and then to the automatic connector end.

4. Device according to claim 1 wherein the vehicle comprises four caterpillar tracks.

5. A vehicle according to claim 1, wherein said cooperating means comprise normally closed valves in passages of said collar adjacent the periphery of the collar, and fluid operated cylinders on said jaws, said cylinders having rods engageable with said valves for operating the valves to an open position.

6. A vehicle according to claim 5, wherein each of the cylinders comprises an enclosure in each jaw, a piston within each enclosure, means to supply control fluid to each side of the piston, a hollow rod attached to each piston and through the interior of which the control fluid can be fed to the collar and then to the automatic connector end.

7. A vehicle according to claim 1, further comprising, a second manipulator arm, a gripping mechanism at the end of said second arm and having first and second jaws, pivot means mounting said jaws on said second arm for pivotal movement relative to each other between open and closed positions, and means mounting said second arm on said frame for articulating movement.

8. A remotely controllable undersea vehicle for connecting undersea conduits to submerged structures, said vehicle having a front and a back, and comprising, a frame, means on said vehicle for moving the vehicle along a floor of a body of water, means for controlling the vehicle from a support vessel at the surface of the body of water, a first upright mast articulated on said frame near the front of said vehicle, a second upright mast spaced from the first mast and articulated on said frame near the back of the vehicle, a first manipulator arm articulated on an end of said first mast, a second manipulator arm articulated on an end of the second mast, a gripping mechanism at the end of each arm, each gripping mechanism having first and second jaws, pivot means mounting the jaws for pivotal movement relative to each other between open and closed positions, motor means for opening and closing said jaws, and wherein the conduit which is connected is tubular and has an automatic connector end, and an external collar on the conduit outwardly of the automatic connector end and which can be engaged by the jaws of the manipulator arm, cooperating means on the collar and the jaws for connecting control fluid passages of the jaws with passages of the collar when the jaws are engaged on the collar, and duct means for transmission of the control fluid between the jaws and the automatic connector end.

* * * * *